United States Patent [19]
Ruof

[11] 3,770,327
[45] Nov. 6, 1973

[54] WHEEL SPEED TRANSDUCER FREQUENCY DOUBLING CIRCUIT

[75] Inventor: Edgar J. Ruof, Akron, Ohio

[73] Assignee: The Goodyear Tire & Rubber Company, Akron, Ohio

[22] Filed: Apr. 21, 1971

[21] Appl. No.: 136,027

[52] U.S. Cl............ 303/21 R, 307/220, 307/225, 307/261, 328/20
[51] Int. Cl............................................ B60t 8/00
[58] Field of Search.................... 180/82, 105 E; 188/181; 235/150.3; 303/20, 21; 307/220, 225, 261, 262, 295; 317/5; 324/160-162; 328/20, 22, 38; 330/24; 340/262-263

[56] References Cited
UNITED STATES PATENTS

| | | | |
|---|---|---|---|
| 3,578,819 | 5/1971 | Atkins | 303/21 P |
| 3,054,068 | 9/1962 | De Jong | 330/24 |
| 3,330,973 | 7/1967 | Clapper | 307/262 |
| 3,564,295 | 2/1971 | Slaats | 328/20 X |
| 3,566,159 | 2/1971 | Plunkett | 307/261 X |
| 3,593,156 | 7/1971 | Jordan | 328/20 |

Primary Examiner—Milton Buchler
Assistant Examiner—Stephen G. Kunin
Attorney—F. W. Brunner, P. E. Milliken and Oldham & Oldham

[57] ABSTRACT

A frequency doubling circuit in combination with an anti-skid control system is presented wherein the alternating current signal output of a wheel speed transducer is trasnformed into a signal having twice the frequency of the wheel speed transducer output and possessing square wave characteristics. Fundamentally, the invention utilizes two series connected operational amplifiers, the first of which transforms the output of the wheel speed transducer into a square wave of the same frequency as the alternating current signal. The second operational amplifier subsequently transforms the square wave into a signal of twice the square wave frequency by causing an operational amplifier to be pulsed at its output on each transition of the square wave signal.

3 Claims, 3 Drawing Figures

INVENTOR
EDGAR J. RUOF

BY
Oldham & Oldham
ATTORNEYS

WHEEL SPEED TRANSDUCER FREQUENCY DOUBLING CIRCUIT

Frequency doubling circuits have numerous uses. For example, a frequency doubler may be used in conjunction with a wheel speed transducer which produces an alternating current signal proportional to the speed of rotation of a wheel. Such transducers are used to provide an input signal to anti-skid brake control systems, for example.

By doubling the frequency of the wheel speed transducer output before the signal is applied to the anti-skid control circuit, it is possible to reduce the complexity of construction of the transducer assembly without sacrificing any degree of control.

Accordingly, it is the primary object of the present invention to provide an improved frequency doubling circuit.

It is also an object of the present invention to provide a frequency doubling circuit which produces an output signal of a clearly defined nature.

The above and other objects of the invention which will be apparent from the following detailed description are achieved by providing a frequency doubling circuit which is comprised, essentially, of a first amplifier which receives an alternating current signal input and produces a square wave output signal of the same frequency as the alternating current input signal and a second amplifier which is driven by both the leading and trailing edges of the first amplifier output to operate for a time period less than the time period between successive leading and trailing edges of the first amplifier output to produce a square wave signal double in frequency.

For a more complete understanding of the invention and of the advantages and objects thereof reference should be had to the following detailed description and the accompanying drawing wherein there is shown a preferred embodiment of the invention.

Figure 1:
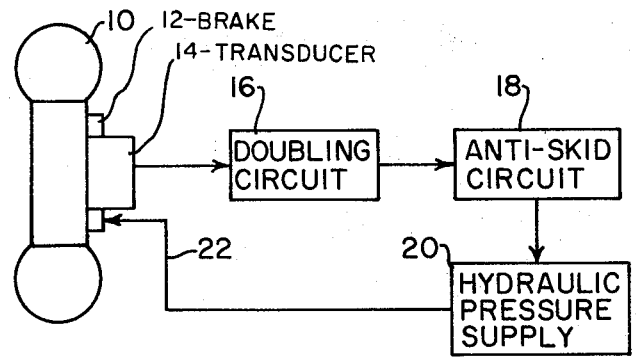
FIG. 1 is a schematic block diagram illustrating the relationship of the frequency doubling circuit of the present invention to an overall anti-skid control circuit.

Referring to the drawings and particularly to FIG. 1 there is shown a rotatable wheel 10 which is provided with hydraulic brake assembly 12 and a wheel speed transducer 14 which produces an alternating current signal proportional to the speed of rotation of the wheel 10. The output of the wheel speed transducer 14 is supplied to the doubling circuit 16, to be described in more detail below, which doubles the frequency of the signal from the wheel speed transducer 14 and supplies this signal to a suitable anti-skid circuit 18. The anti-skid circuit 18 controls hydraulic pressure supply 20 to regulate the pressure applied to the brake assembly 12 through the conduit 22 to assure efficient, non skidding braking action.

Figure 2:
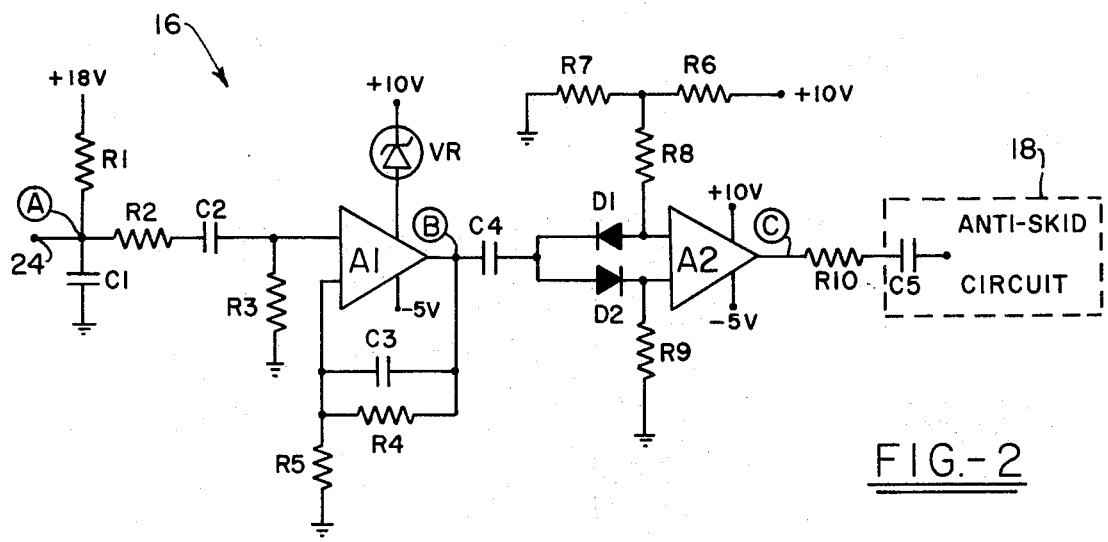
FIG. 2 is a schematic circuit diagram of the frequency doubling circuit of the present invention.
Figure 3:
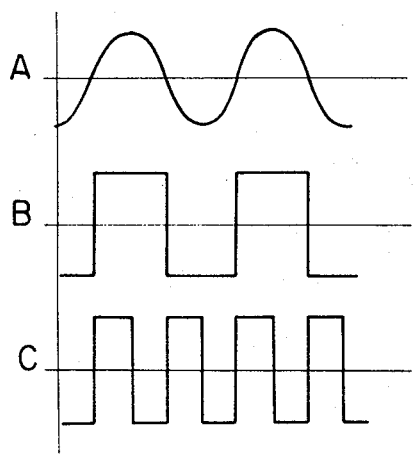
FIG. 3 is a graphic illustration of the wave shape of the electrical signal at critical points in the circuit of FIG. 2.

The frequency doubling circuit 16 is illustrated in grater detail in FIG. 2. The alternating current signal from the wheel speed transducer 14 is supplied to the circuit 16 at 24. This signal is of the wave form shown at A in FIG. 3, with the frequency of the signal varying in proportion to variation in wheel rotation speed. Resistor R1 provides DC excitation to the wheel speed transducer from the +18v power supply. The resistor R2 and capacitor C1 form a high frequency filter for the input signal. The input signal from the conductor 24 is supplied to a capacitor C2 which blocks the DC level of the input signal while passing the AC signal. The AC signal via capacitor C2 is supplied to an amplifier A1. The resistor R3 offers a DC ground path for the input of A1. The amplifier A1 is squaring amplifier with the resistors R4 and R5 providing positive feedback to give a slight latching effect that provides a bias for noise immunity. The zener diode VR makes the positive and negative voltages to the amplifier A1 of equal amplitude, thus making the output of A1 symmetrical about ground and making the bias voltages of equal amplitude. The capacitor C3 serves to sharpen the leading and trailing edges of the output of amplifier A1. As is shown in FIG. 3, the output signal of amplifier A1 is in the form of the signal B, that is a square wave form signal having the same frequency as the alternating current input signal A.

The square wave signal B from the amplifier A1 is supplied through a capacitor C4 and diodes D1 and D2 to a second amplifier A2. In its quiescent state, the amplifier A2 is turned off by the positive bias voltage provided by the resistors R6 and R7 through the resistor R8. It should be noted that the diodes D1 and D2 are the opposite polarities so that the diode D2 passes only the leading edges of the signal B while the diode D1 passes only the trailing edges. The positive-going edge of the square wave signal B, passing through the diode D2, causes A2 to turn on, the time being determined by the time constant of C4 and R9. The negative-going edge of the square wave form signal B, passing through the diode D1, causes A2 to turn on for a time determined by the time constant of C4 and R8. Since R8 and R9 are of equal resistance, and R7 is small compared with R8 or R9, the output pulses of the amplifier A2 are of equal duration, and their frequency is double that of the transducer output. The output signal of the amplifier A2 is of the wave form C shown in FIG. 3.

While only the best known embodiment of the invention has been illustrated and described in detail, the invention is not so limited. Likewise, while the invention has been described with particular reference to its use in an anti-skid control system, the use of the invention is not so limited. Reference should therefore be had to the appended claims in determining the true scope of the invention.

What is claimed is:

1. In an anti-skid control system having a wheel speed transducer which produces an alternating current signal proportional in frequency to wheel rotation speed, braking means for the wheel, and an anti-skid circuit regulating braking means application in response to the alternating current signal to provide non-skidding braking action, the improvement comprising:

first amplifier means receiving the alternating current signal from the wheel speed transducer and producing a square wave signal of the same frequency as the alternating current signal;

second amplifier means receiving the square wave signal from the first amplifier means and activated by both the leading and trailing edges of said signal to produce a single signal of double the frequency of the alternating current signal, the signal produced by the second amplifier means supplying the input to the anti-skid circuit; and the second amplifier means comprising an operational amplifier and wherein the signal from the first amplifier means is supplied to the second amplifier means through a circuit comprising a capacitor, first and second diodes of opposite polarity in parallel connection between the capacitor and the second amplifier means, a first resistor connected to a positive voltage source and between the first diode and the second amplifier means, and a second resistor connected to ground and between the second diode and the second amplifier means.

2. The improvement according to claim 1 wherein the time constant of the capacitor and the first resistor and the time constant of the capacitor and the second rsistor are equal and each less than the time between successive edges of the first amplifier means output signal.

3. The improvement according to claim 1 wherein the first amplifier means is provided with a feedback circuit including a capacitor to sharpen the leading and trailing edges of the output signal of the first amplifier means.

* * * * *